(12) United States Patent
Soederhuizen et al.

(10) Patent No.: US 9,586,696 B2
(45) Date of Patent: Mar. 7, 2017

(54) SYSTEM AND METHOD FOR PARKING AND PROCESSING AIRCRAFT

(71) Applicant: Rau B.V., Amsterdam (NL)

(72) Inventors: Maarten Soederhuizen, De Bilt (NL); Jonas Van Stekelenburg, Heemstede (NL); Johannes Petrus Cornelis Maria Van Der Linden, Gouda (NL); Johannes Maria Voeten, Roosendaal (NL); Esther Marcella Dekker, The Hague (NL); Pieter Hendrik Ringersma, Voorburg (NL); Antonius Stallaart, Rotterdam (NL); Thomas Martin Rau, Laren (NL); Ludovicus Adriaan Peter Klaassen, Rotterdam (NL); Dennis Johannes Maurice Grootenboer, Almere (NL); Gerardus Maria Manshanden, Barendrecht (NL); Hendrikus Albertus Adrianus Maria De Ruijter, Eindhoven (NL); Petrus Marinus Hendrikus Van Zijl, Maarssen (NL); Wouterus Johannus Hagen, Rotterdam (NL)

(73) Assignee: RAU B. V., Amsterdam (NL)

( * ) Notice: Subject to any disclaimer, the term of this patent is extended or adjusted under 35 U.S.C. 154(b) by 0 days.

(21) Appl. No.: 14/647,660

(22) PCT Filed: Nov. 26, 2013

(86) PCT No.: PCT/NL2013/050852
§ 371 (c)(1),
(2) Date: May 27, 2015

(87) PCT Pub. No.: WO2014/084728
PCT Pub. Date: Jun. 5, 2014

(65) Prior Publication Data
US 2015/0329219 A1    Nov. 19, 2015

(30) Foreign Application Priority Data

Nov. 27, 2012   (NL) .................................... 2009881

(51) Int. Cl.
*B64F 1/00*     (2006.01)
*B64F 1/36*     (2006.01)
(Continued)

(52) U.S. Cl.
CPC .................. *B64F 1/22* (2013.01); *B64F 1/00* (2013.01); *B64F 1/002* (2013.01); *B64F 1/36* (2013.01); *E04H 6/44* (2013.01); *E04B 1/346* (2013.01)

(58) Field of Classification Search
CPC ...... B64F 1/00; B64F 1/22; B64F 1/36; B64F 1/24; B64F 1/30; E04H 6/44; E04B 1/346
(Continued)

(56) References Cited

U.S. PATENT DOCUMENTS 3,751,990 A    8/1973 Blechman
3,842,553 A    10/1974 Billgren et al.
(Continued)

FOREIGN PATENT DOCUMENTS

DE    102006050668 A1    4/2008

*Primary Examiner* — Richard G Davis
(74) *Attorney, Agent, or Firm* — The Webb Law Firm

(57) ABSTRACT

The invention relates to an improved system for parking and processing aircraft in relatively efficient manner. The invention also relates to an improved method for parking and processing aircraft in relatively efficient manner, particularly by making use of a system for parking and processing aircraft according to the invention.

41 Claims, 11 Drawing Sheets

(51) Int. Cl.
  *B64F 3/00*   (2006.01)
  *B64F 1/22*   (2006.01)
  *E04H 6/44*   (2006.01)
  *E04B 1/346*  (2006.01)

(58) Field of Classification Search
  USPC .................................................. 244/114 R
  See application file for complete search history.

(56) References Cited

U.S. PATENT DOCUMENTS

| | | | | |
|---|---|---|---|---|
| 3,915,319 | A * | 10/1975 | Fairburn | E04H 6/44 187/266 |
| 6,102,331 | A * | 8/2000 | Hong | B63B 35/50 114/258 |
| 2005/0166851 | A1 * | 8/2005 | Holscher | A01K 1/126 119/14.04 |
| 2009/0266301 | A1 * | 10/2009 | Oliver | E04B 1/346 119/14.04 |
| 2011/0010912 | A1 | 1/2011 | Bausen et al. | |

\* cited by examiner

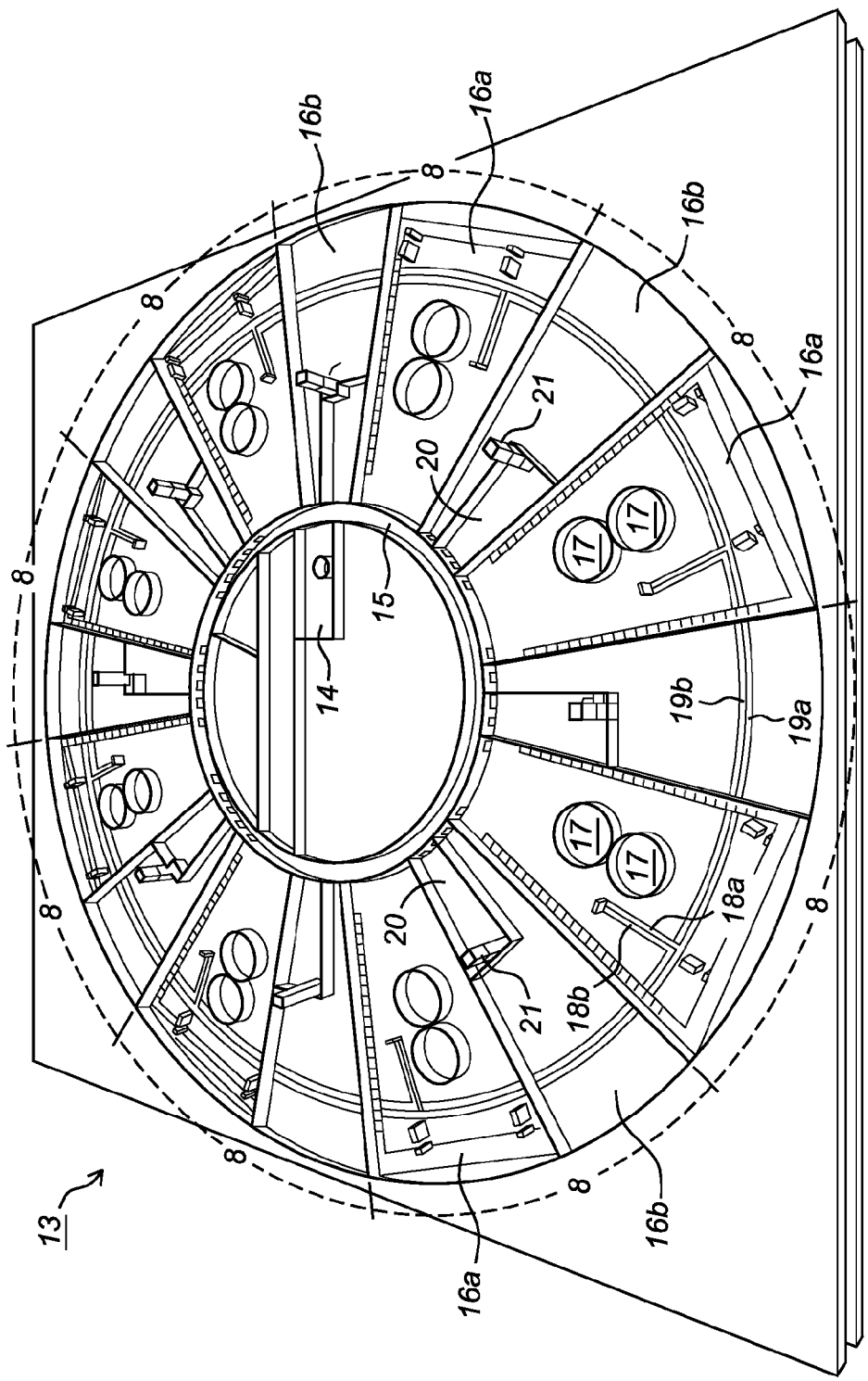

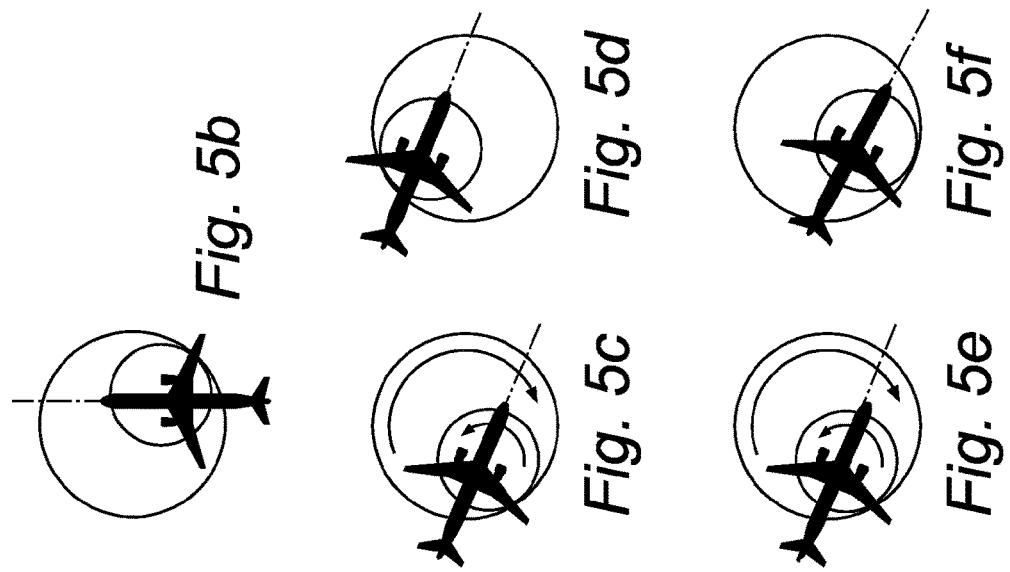
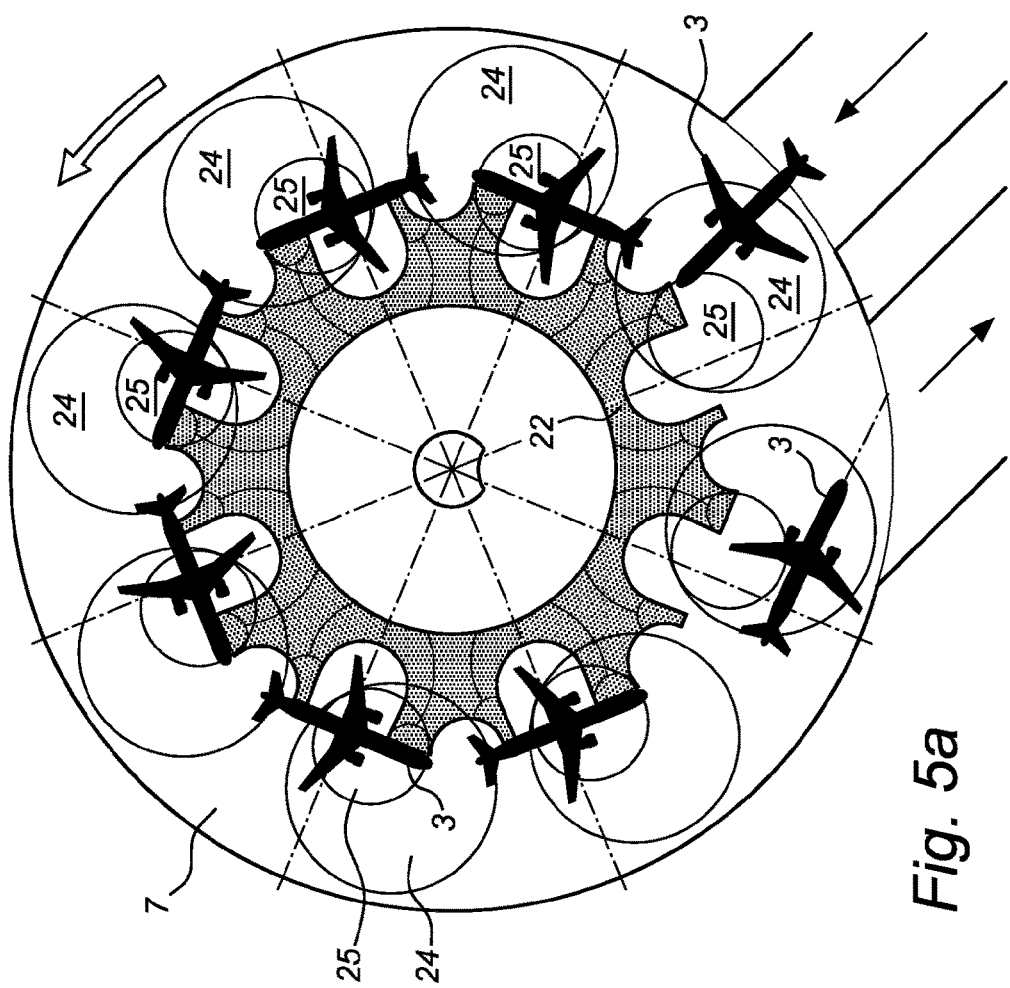

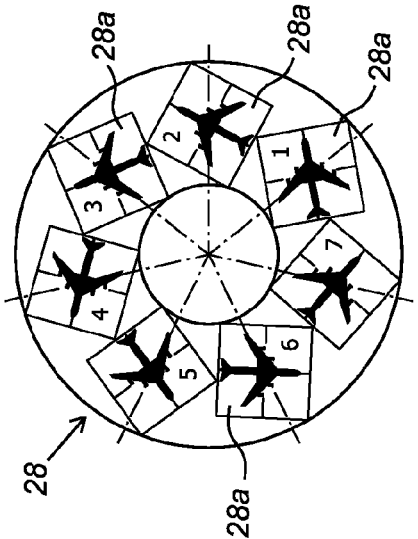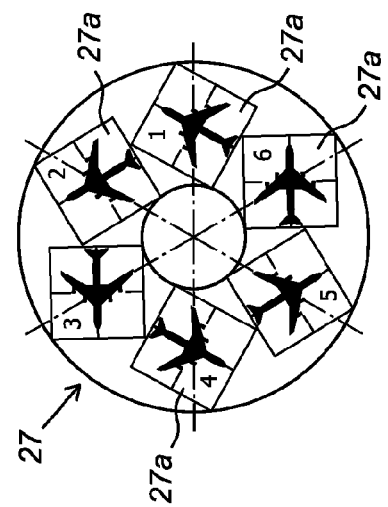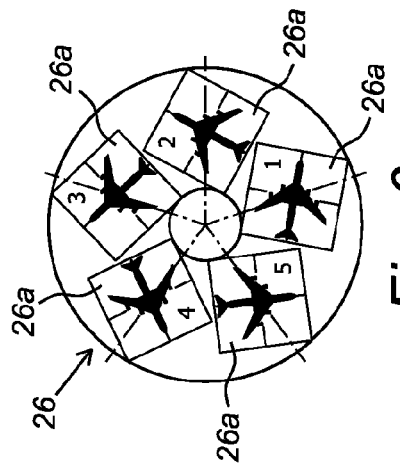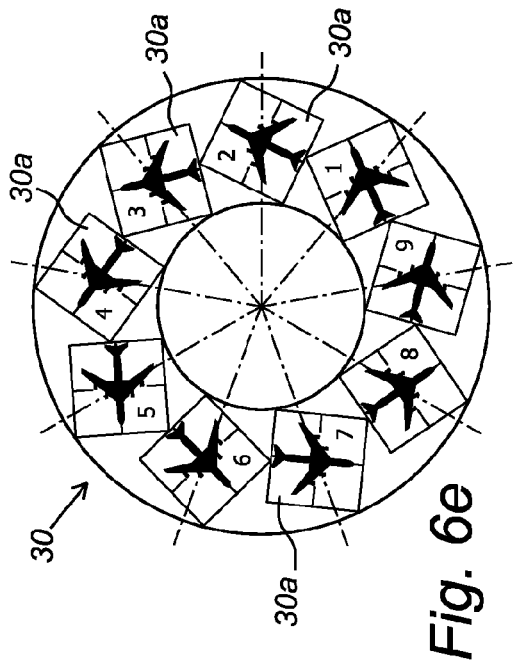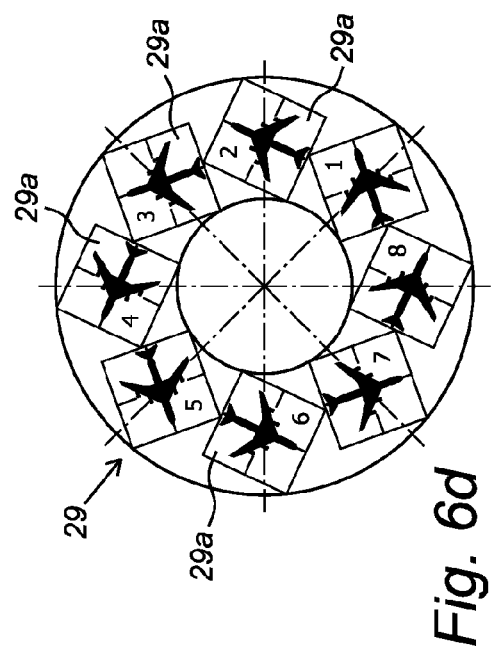

SYSTEM AND METHOD FOR PARKING AND PROCESSING AIRCRAFT

CROSS-REFERENCE TO RELATED APPLICATIONS

This application is the United States national phase of International Application No. PCT/NL2013/050852 filed Nov. 26, 2013, and claims priority to Netherlands Patent Application No. 2009881 filed Nov. 27, 2012, the disclosures of which are hereby incorporated in their entirety by reference.

BACKGROUND OF THE INVENTION

Field of the Invention

The invention relates to a system for parking and processing aircraft. The invention also relates to a method for parking and processing aircraft, particularly by making use of a system for parking and processing aircraft according to the invention.

Description of Related Art

Now that air traffic is becoming increasingly intensive, problems occur during the processing of aircraft parked on the aprons of airports. An increasing number of vehicles and persons are present on and at the aprons, which entails high costs and may result in unsafe situations. Airlines demand ever quicker processing so as to achieve a shorter turn-around time. The composition of airline fleets moreover changes more frequently, necessitating more and more changes to the layout of the aprons and the method of processing. Finally, airlines wish to pay increasingly less for the processing. Furthermore, the increase in the number of aircraft at an airport per unit of time increasingly results in transport flows cutting across each other, and therefore in waiting time wherein an aircraft has to wait for a gate to become available and be released before this aircraft can be assigned to the relevant gate.

In respect of the above it is an important object of the invention to provide an improved system and an improved method for enabling more efficient processing of aircraft.

SUMMARY OF THE INVENTION

The invention provides for this purpose a system for parking and processing aircraft, comprising: at least one transport device for transporting aircraft from an arrival location to a departure location at a distance from the arrival location, wherein the transport device comprises a plurality of processing segments lying in line and displaceable between the arrival location and the departure location, wherein each processing segment is configured to support and process at least one aircraft and wherein each processing segment is provided with at least one loading station and at least one unloading station for respectively loading and unloading the parked aircraft between the arrival location and the departure location, and at least one passenger terminal positioned relative to the transport device such that the passenger terminal is configured to co-act with aircraft parked on the transport device for the purpose of allowing passengers to deboard and board between the arrival location and the departure location. Parking of the aircraft for processing on a transport device enables aircraft to be processed sequentially during a predetermined processing period. When an aircraft arrives at an airport the aircraft will be transported in the direction of a—usually reserved—processing segment, after which the processing takes place. Because the processing takes place during a predetermined processing period, the processing of aircraft can take place relatively efficiently and in a relatively short time. Because the aircraft are processed sequentially (successively), the arrival process and the departure process of aircraft can moreover be adapted hereto, whereby the successive transport flows need not cross each other and delays can be reduced considerably. The at least one loading station applied is configured to load the aircraft with for instance luggage, freight, provisions, electricity, liquids such as water and fuel, particularly kerosene, and gases such as compressed air or oxygen. Each loading station will usually, though not necessarily, be configured to supply the aircraft with one type of the above-mentioned goods/substances. The at least one unloading station applied is configured to remove luggage, freight, rainwater and/or liquid or solid waste such as leaked fuel, de-icing liquid and toilet waste from the aircraft. Each unloading station will usually also be configured to discharge one type of said goods/substances from the aircraft.

Several advantageous embodiments of the system according to the invention will be described hereinbelow by way of illustration. Use is made in some embodiments of several inventive concepts. It is possible to envisage individual inventive concepts and technical measures being applied without all details of a determined embodiment also being applied therein.

It will be apparent that diverse modifications to the embodiments described below can be envisaged by a skilled person, wherein a skilled person can combine different inventive concepts and/or technical measures of different embodiments without departing from the inventive concept described in the appended claims.

In a preferred embodiment of the system according to the invention the transport device is configured to displace the processing segments in a single direction. The direction of transport of the processing segments can here be linear or non-linear, in particular curved. The advantage of displacing the processing segments in a single direction is that all processing segments can be positioned in the same plane, whereby practically all, or at least substantially all processing segments can be effectively employed at any moment, this enhancing the capacity of the transport device and also being advantageous from a structural viewpoint. The transport device will hereby generally take a continuous form.

Although it is possible to envisage a processing segment being configured to simultaneously support a plurality of aircraft for processing, it is generally advantageous from a logistical and structural viewpoint for each processing segment to be configured to support one (single) aircraft. Each processing segment can in this way be optimized for the purpose of processing the relevant aircraft, among other ways by applying the one or more loading stations and unloading stations.

It is generally advantageous for the processing segments to connect to each other. Gap formation between the processing segments, which could result in a loss of efficiency of the transport device and in potentially dangerous situations, can in this way be prevented. The processing segments are preferably connected integrally to each other here, preferably in a mutually fixed orientation. A substantially flat processing apron is hereby formed which is preferably positioned in a substantially horizontal plane. By axially rotating the processing apron, generally formed by an (annular) disc, the in that case circle segment-shaped processing segments will be displaced along a curved path, in particular a circular path. Processing segments are guided here along (a stationary part of) the passenger terminal. It is possible here to envisage the passenger terminal enclosing the axially rotatable processing apron, although from a structural and financial viewpoint it is generally more advantageous for at least part of the passenger terminal to be enclosed by the processing apron.

In a preferred embodiment a base part of the passenger terminal will have a stationary disposition, wherein the base part is permanently and immovably connected to the fixed world. In addition to the stationary base part, the passenger terminal preferably comprises at least one mobile part connected displaceably to the stationary base part. The mobile part of the passenger terminal is preferably rotatable here such that the displaceable part of the passenger terminal and an adjacent processing segment can co-act in substantially stationary manner along a path situated between the arrival location and departure location. The rotation speed of the processing apron and the rotation speed of the mobile part of the passenger terminal are substantially the same here. It is possible here to envisage the processing apron and the mobile part of the passenger terminal being mutually connected. In a preferred embodiment the displaceable part of the passenger terminal comprises a plurality of footbridges, wherein each footbridge is configured for coupling between the arrival location and the departure location to an aircraft parked on a processing segment to allow deboarding and boarding of passengers. It is possible here to envisage each footbridge being pivotally connected to another part of the mobile part of the passenger terminal. This pivotability can extend in horizontal direction and/or vertical direction. The number of footbridges used will generally be greater than the number of processing segments used, making it possible to couple several footbridges simultaneously to an aircraft.

As already indicated, at least one loading station is preferably configured to load the aircraft with luggage or freight, and at least one unloading station is preferably configured to remove luggage or freight from the aircraft. Such a loading station and unloading station can be provided with a conveyor belt for transporting luggage into and out of the aircraft. The luggage will generally be transported here through a deck layer of the processing segment, wherein a luggage area is positioned under the deck layer. The above described loading station and unloading station are preferably displaceable between an extended or pushed-out operational position and a compact non-operational position. In an operational position at least a part of the loading station and unloading station protrudes relative to the deck layer to enable connection to the luggage area of the aircraft. In the non-operational position the loading station and unloading station will be positioned at least substantially in the deck floor, which makes parking of an aircraft on the processing segment considerably easier.

In the deck layer of each processing segment can also be received: foldable scissor lifts for loading and unloading containers, cabin services and catering products, in particular provisions, telescopically expanding pylons which for supply and discharge of water and air, at least one pit for supplying electrical energy to the aircraft and at least one pit with a fuel feed robot. In non-operational position such loading stations and unloading stations preferably are accommodated substantially wholly in the deck floor of the processing segment so as to be able to guarantee as far as possible unimpeded transport of aircraft. The deck layer is optionally provided here with one or more floor heating elements in order to thaw ice and snow.

In respect of the thickness to be selected for the deck layer of each processing segment it is necessary to take into account, among other factors, the occurring load, the length of spans (possible bridging of pipes, cables and conduits or the like), the gradient for drainage, dimensions of provisions to be arranged in the deck layer and the influence of the deck layer on headroom for vehicles and aircraft. The different conduits for electricity, compressed air, preconditioned air, drinking and waste water, fuel and the like can each be connected to separate pits arranged in the deck layer and taking up the most optimal position possible relative to the aircraft for servicing.

The system according to the invention preferably comprises at least one supply container for fuel connected to at least one loading station and positioned at least partially under the displaceable processing segments. The supply container is preferably connected here to the processing segment, whereby the supply container for fuel is also disposed in displaceable manner. It is also possible to envisage the supply container being disposed stationary under or close to the processing segment, wherein the loading station is for instance coupled to the supply container by means of a slide coupling. The system preferably also comprises at least one supply container for water connected to at least one loading station and positioned at least partially under the displaceable processing segments. This supply container can also be disposed in mobile or stationary manner under or close to each processing segment. The system preferably comprises at least one supply container for waste water connected to at least one unloading station and positioned at least partially under the displaceable processing segments. This unloading station can also take a mobile or stationary form.

In a particular preferred embodiment at least one displaceable processing segment comprises at least one axially rotatable first manoeuvring disc for manoeuvring at least one support wheel, preferably all support wheels, of the aircraft. Applying such an axially rotatable manoeuvring disc in the displaceable processing segment facilitates parking of aircraft in a desired position. The aircraft is here first moved onto and parked on the manoeuvring disc, after which the manoeuvring disc will be rotated such that the aircraft is manoeuvred into a correct processing position. This manoeuvring can be further optimized when at least one displaceable processing segment comprises at least one axially rotatable second manoeuvring disc for manoeuvring at least one support wheel of the aircraft, wherein the first manoeuvring disc is more preferably enclosed by the second manoeuvring disc. The aircraft can be displaced quite easily and precisely to a desired position on the processing segment by means of this disc-in-disc construction, wherein the manoeuvring discs rotate independently and usually in opposite direction to each other.

The processing segments, which usually together form an axially rotatable processing platform, are preferably supported by at least one stationary support structure. It is possible here to envisage the processing segments being provided with transport wheels, these transport wheels being configured for co-action with at least one guide track forming part of the stationary support structure. The transport wheels can be formed by air-filled wheels, although it is usually advantageous to use substantially rigid flanged wheels (train wheels) for the purpose. In an alternative preferred embodiment the support structure is provided with at least one liquid column, wherein the processing segments are supported by the at least one liquid column. The frictional resistance during rotation of the processing platform can in this way be minimized considerably. It is also possible to envisage holding the processing apron at a distance from a part of the support structure lying thereunder by means of an air layer. It is further possible to envisage having the processing apron float above the support structure by means of one or more electromagnets which can be attached to the processing apron and/or the support structure, whereby a minimal frictional resistance can also be realized during rotation.

Rotation of the processing segments, in particular the processing apron, preferably takes place by means of at least one drive unit, such a an electric motor, coupled to the transport device. It is made possible by means of the system according to the invention to fully process an aircraft within a fixed period of time. The drive unit is preferably controlled here by means of a control unit such that each processing segment is displaced within a time period of between 30 and 60 minutes from the arrival location to the departure location.

The number of processing segments preferably lies between 4 and 12, in particular between 5 and 9, whereby a balance is found between sufficient processing capacity of the system on the one hand and on the other a peripheral speed sufficiently low to enable parking of aircraft on the processing segments in relatively reliable manner.

The system can comprise a plurality of transport devices and a plurality of passenger terminals so as to increase the overall processing capacity of the system.

The invention also relates to an airport provided with a system according to the invention.

The invention also relates to a method for parking and processing aircraft, in particular by making use of a system according to the invention, comprising of: A) parking an aircraft on a processing segment of a transport device at an arrival location, B) displacing the processing segment in the direction of a departure location, wherein the aircraft is coupled during this displacement to a passenger terminal and one or more loading stations and unloading stations for the purpose of loading and unloading the aircraft, and C) removing the aircraft from the processing segment when it reaches the departure location. Advantages of the method which enables sequential loading and unloading of aircraft according to a tight schedule have already been discussed in the foregoing. Steps A)-C) preferably take a period of time of between 30 and 60 minutes, whereby the processing time not only remains limited but also predefined, this being advantageous from a logistical viewpoint. Multiple series of steps A)-C) are generally performed in succession in order to realize a sequential processing of aircraft. The time duration for the actual processing of an aircraft as according to step B) will overlap here with that for processing of one or more subsequent aircraft as according to step B).

BRIEF DESCRIPTION OF THE DRAWINGS

The invention will be elucidated on the basis of non-limitative exemplary embodiments shown in the following figures. Herein:

FIGS. 5b-5f show top views of successive manoeuvring steps for manoeuvring an aircraft on an apron as shown in FIG. 5a, and FIGS. 6a-6e respectively show alternative aprons for use in a system according to the invention.

DETAILED DESCRIPTION OF THE INVENTION

Figure 1:
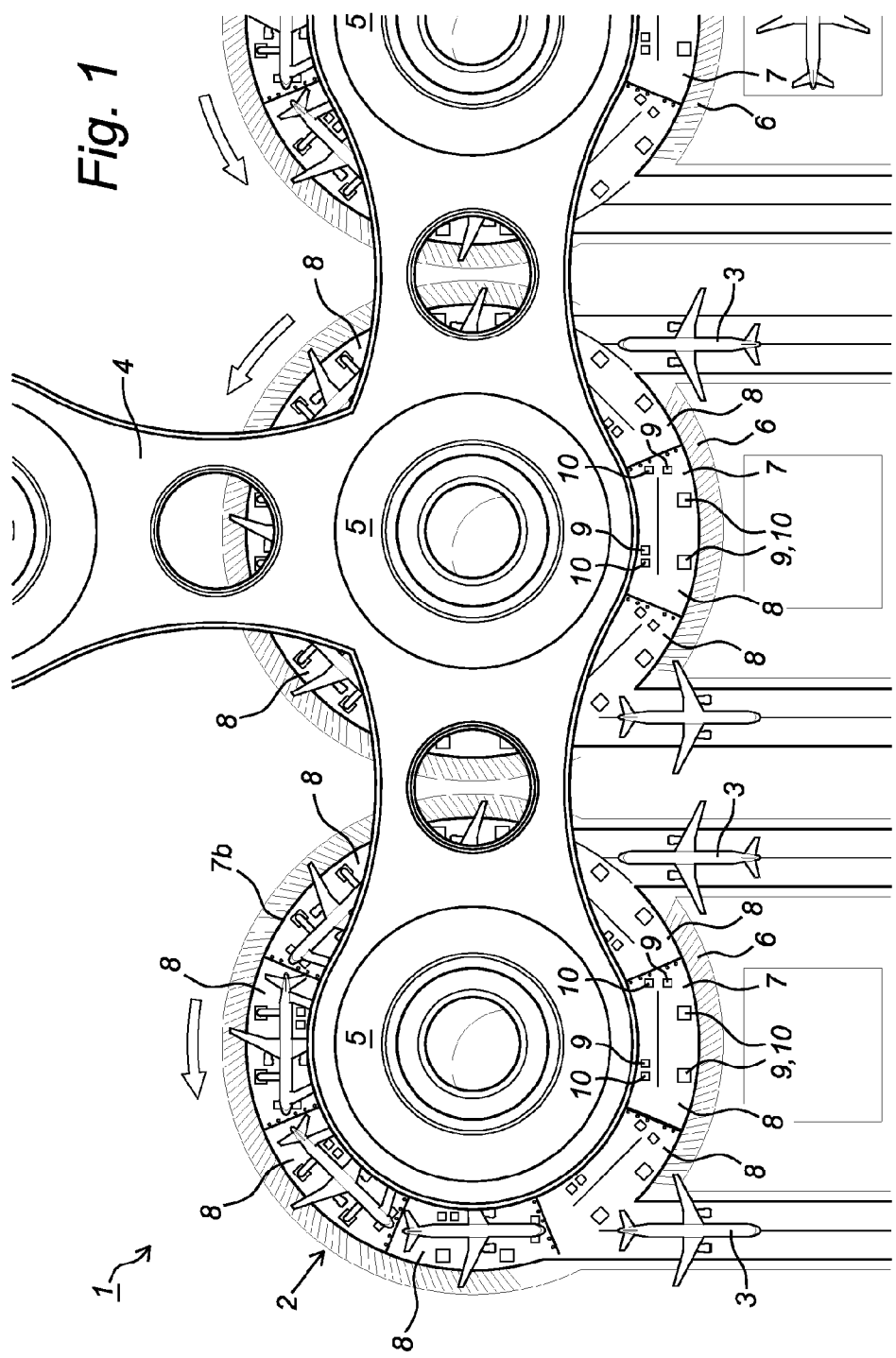
FIG. 1 shows a top view of an airport provided with a system for parking and processing aircraft according to the invention.

FIG. 1a shows a top view of an airport 1 provided with a system 2 for parking and processing aircraft 3 according to the invention. System 2 comprises for this purpose an airport building 4 provided with a plurality of passenger terminals 5 via which passengers can deboard and board an aircraft 3. Each passenger terminal 5 is enclosed for this purpose by a transport device 6 for parking and processing aircraft. Transport device 6 comprises an axially rotatable apron 7 constructed from a plurality of integrally connected processing segments 8. Each processing segment 8 is configured in this exemplary embodiment to support and process one aircraft 3. Parking an aircraft 3 on rotating apron 7 from an arrival location A makes it possible to transport aircraft 3 around passenger terminal 5 until a departure location B is reached, where aircraft 3 will leave apron 7 and usually move in the direction of a runway for departure of aircraft 3 from airport 1. During rotation of aircraft 3 in a carousel around passenger terminal 5 the aircraft 3 can be processed sequentially and in a predetermined period of time subject to the rotation speed of apron 7, this being particularly advantageous from a logistical viewpoint. Aircraft 3 can be processed in relatively efficient manner because the orientation between an aircraft 3 parked on a processing segment 8 and the processing segment itself remains unchanged between arrival location A and departure location B. Each processing segment 8 is provided here with diverse loading stations 9 for, among others, luggage, freight, catering, drinking water, fuel, electricity, digital data and so on for the purpose of supplying aircraft 3, as well as diverse unloading stations 10 for removing luggage, necessities, solid waste, liquid waste and so on from aircraft 3. In order to allow easy boarding and deboarding of passengers each passenger terminal 5 is provided with an axially rotatable part 11 (see FIG. 2a) turning at the same speed as rotatable apron 7, whereby the displaceable part of terminal 5 can be connected in relatively simple manner to aircraft 3. It is possible here to envisage apron 7 and displaceable part 11 of terminal 5 being mutually connected. Processing segment 8 is also referred to as lock, box or docking station. This exemplary embodiment assumes that aircraft 3 needs a space of 50×50 meters. A total of eight processing segments 8 are used, five or six of which can effectively be utilized at a time to support and process an aircraft 3. In this exemplary embodiment the diameter of an inner peripheral side 7a of apron 7 amounts to 120 meters (see FIG. 2a) and the diameter of an outer peripheral side 7b of apron 7 amounts to 226 meters. The total surface area of apron 7 amounts to 28,779 m$^2$. The applied rotation speed amounts to 48 minutes per revolution, which amounts to 13.2 cm/s on the inner peripheral side 7a and 24.7 cm/s on the outer peripheral side 7b. On the basis of these speeds an aircraft 3 can be carried around passenger terminal 5 within about 30 minutes. During this period aircraft 3 is fully processed. This means that passengers deboard and board, that luggage and freight are unloaded and loaded, that fuel is supplied to aircraft 3, that the aircraft is provided with electricity and data, that catering is taken on board, that the water supply is replenished and so on.

Figure 2A:
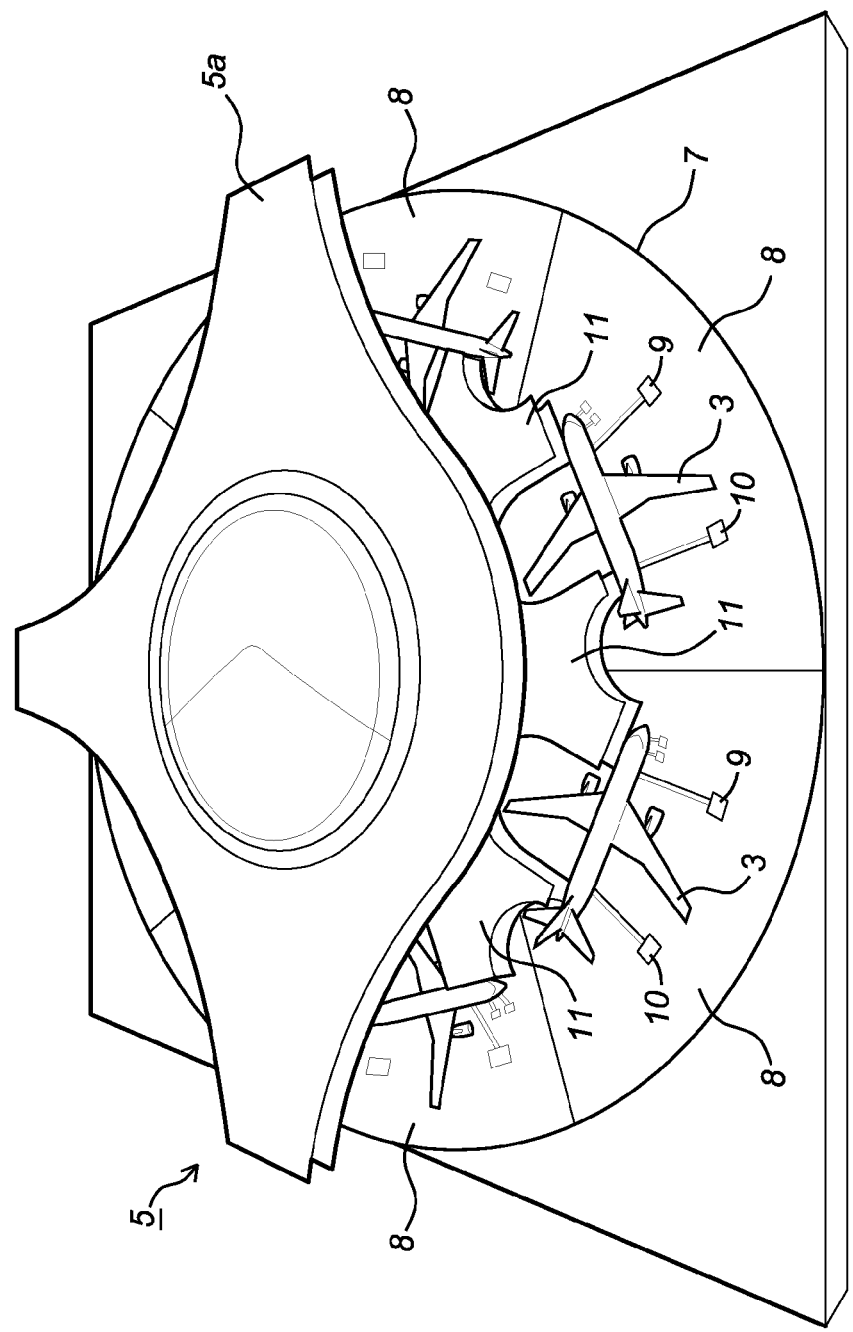
FIGS. 2a-3 show different views of the system according to FIG. 1.

FIG. 2a is a perspective view of a system of a passenger terminal 5 and a transport device 6 as shown in FIG. 1. An upper part of passenger terminal 5 is shown cut-away so that the internal construction of passenger terminal 5 is made visible in this figure. As shown, passenger terminal 5 is constructed from multiple floor levels. An upper floor level 5a has a fixed stationary arrangement connected to the fixed world. A lower floor level is disposed rotatably and forms the displaceable part 11 of terminal 5 which enables efficient boarding and deboarding of passengers. This figure also shows that aircraft 3 is not only coupled to the mobile part 11 of terminal 5 but also to diverse loading stations 9 and unloading stations 10 for the purpose of processing (preparing) aircraft 3 for a subsequent flight, as shown in FIG. 1.

Figure 2B:
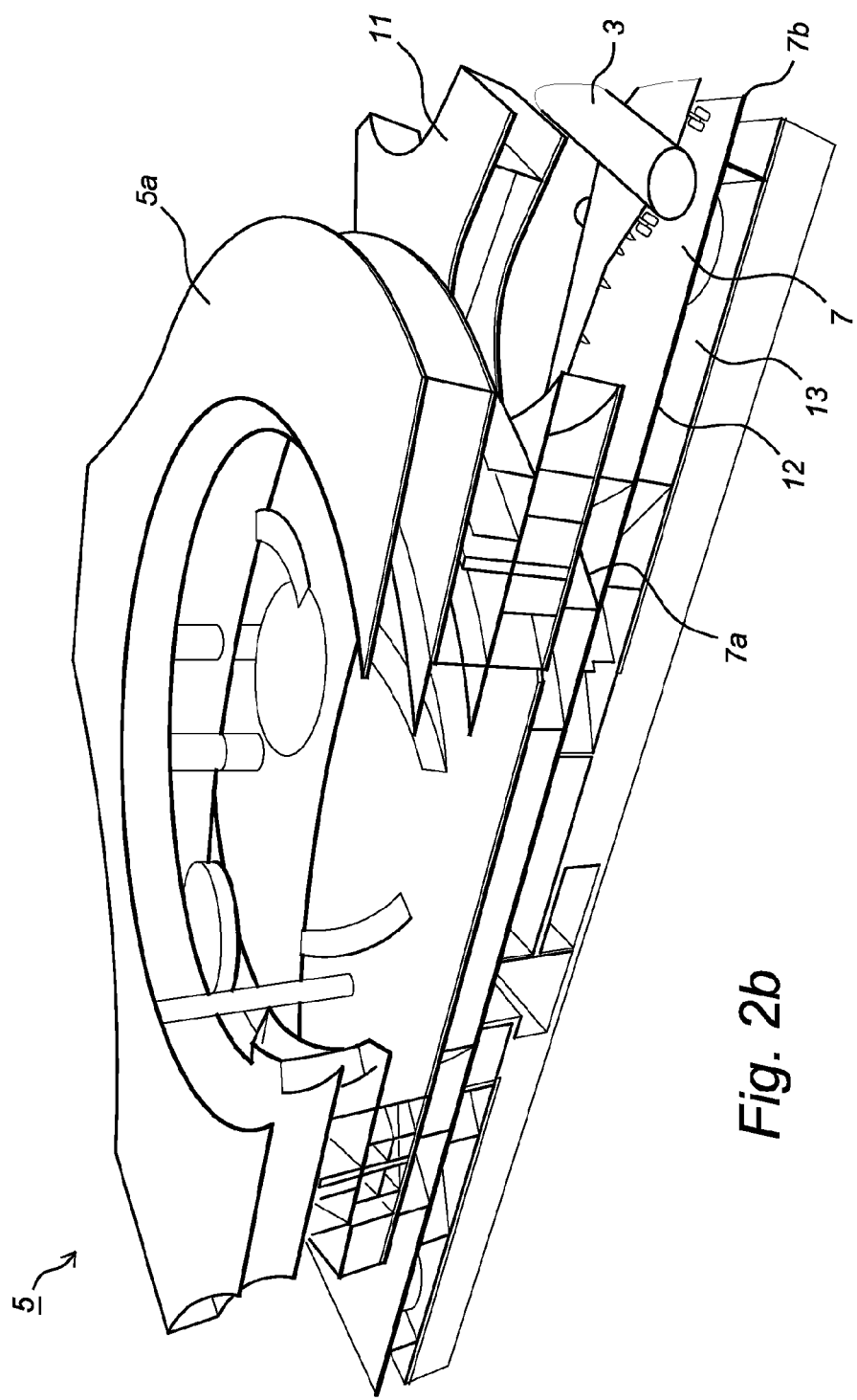

FIG. 2b shows a cross-section of the system in which the floor levels of terminal 5 are also visualized. The open centre of terminal 5 ensures that the mobile (boarding) part 11 of terminal 5 is substantially always visible to a passenger, this being reassuring for the passengers. FIG. 2b also shows that a maintenance area 13 is positioned under a deck floor 12 of apron 7, which area is employed for storage and transport of goods and liquids, such as water and fuel. This underlying maintenance area 13 is shown in further detail in FIG. 2c. Maintenance area 13 comprises a central entrance 14 which connects to an annular space 15 via which access can be gained to the different maintenance compartments 16a, 16b. In this exemplary embodiment two types of maintenance compartment are shown: a first maintenance compartment 16a for dealing with liquids such as water and fuel, generally kerosene, and a second maintenance compartment 16b for dealing with goods such as luggage, freight, electricity, data and provisions (catering). The first maintenance compartment 16a comprises fuel tanks 17 and a supply conduit 18a for clean water (drinking water) and a discharge conduit 18b for used water (waste water). Water conduits 18a, 18b are each connected to their own annular passage 19a, 19b which passes through all maintenance compartments 16a, 16b. The second maintenance compartment 16b is provided with a transport and storage space 20 for goods such as luggage and freight, and a lift 21 enabling displacement of the goods in vertical or diagonal direction to aircraft 3. The lifts 21 applied are configured to pass through deck floor 12 of apron 7. Maintenance compartments 16a, 16b are configured to co-rotate with apron 7, and at the same speed. Central entrance 14 and annular access area 15 will generally be arranged stationary relative to the fixed world.

Figure 2D:
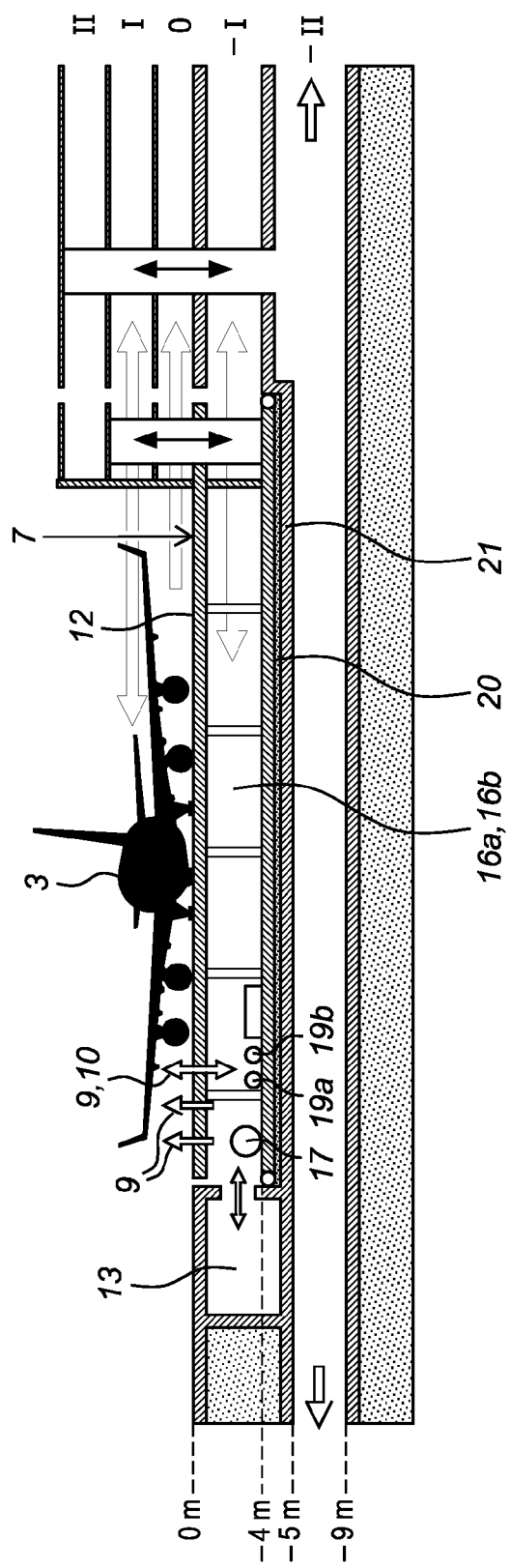

FIG. 2d is another cross-section of the system as shown in FIG. 2a, in which the applied components are shown more schematically. Shown particularly in FIG. 2d are the different floor levels -II, -I, 0, I, II, wherein floor level 0 forms the ground floor which is at the same level as deck floor 12 of apron 7 on which aircraft 3 is parked. This floor level 0 can also be used to guide passengers quickly and effectively into passenger terminal 5 in the case of a flight with high security risk. The axially rotatable part of first floor level I will generally be used for boarding and deboarding of passengers. The upper floor level II is usually used as panorama level, where catering and/or shopping establishments are located. As shown in FIGS. 2b and 2c, maintenance compartments 16a, 16b are positioned under deck floor 12, on floor level -I, for the purpose of dealing with fuel, water, luggage, freight, electrical energy, digital information (data), provisions and other matters. As shown in this figure, goods and liquids can be transported to a position under aircraft 3 and be carried via deck layer 12 of apron 7 to/into aircraft 3. Apron 7 with the maintenance compartments 16a, 16b positioned thereunder is formed by a single annular hollow structure which is axially rotatable and driven by an electric motor, combustion motor or other type of motor (not shown). The hollow structure in fact floats here on a liquid layer 20, in particular a water layer, which is arranged on a stationary support structure 21, this minimizing friction between the hollow structure and support structure 21 during the rotation process. The lower floor level -II is configured to transport goods such as luggage and freight, auxiliary materials, electricity, water, fuel, personnel, data and so on. Vertical transport takes place between the floor levels, usually by means of lifts and optionally (escalator) stairs.

Figure 3:
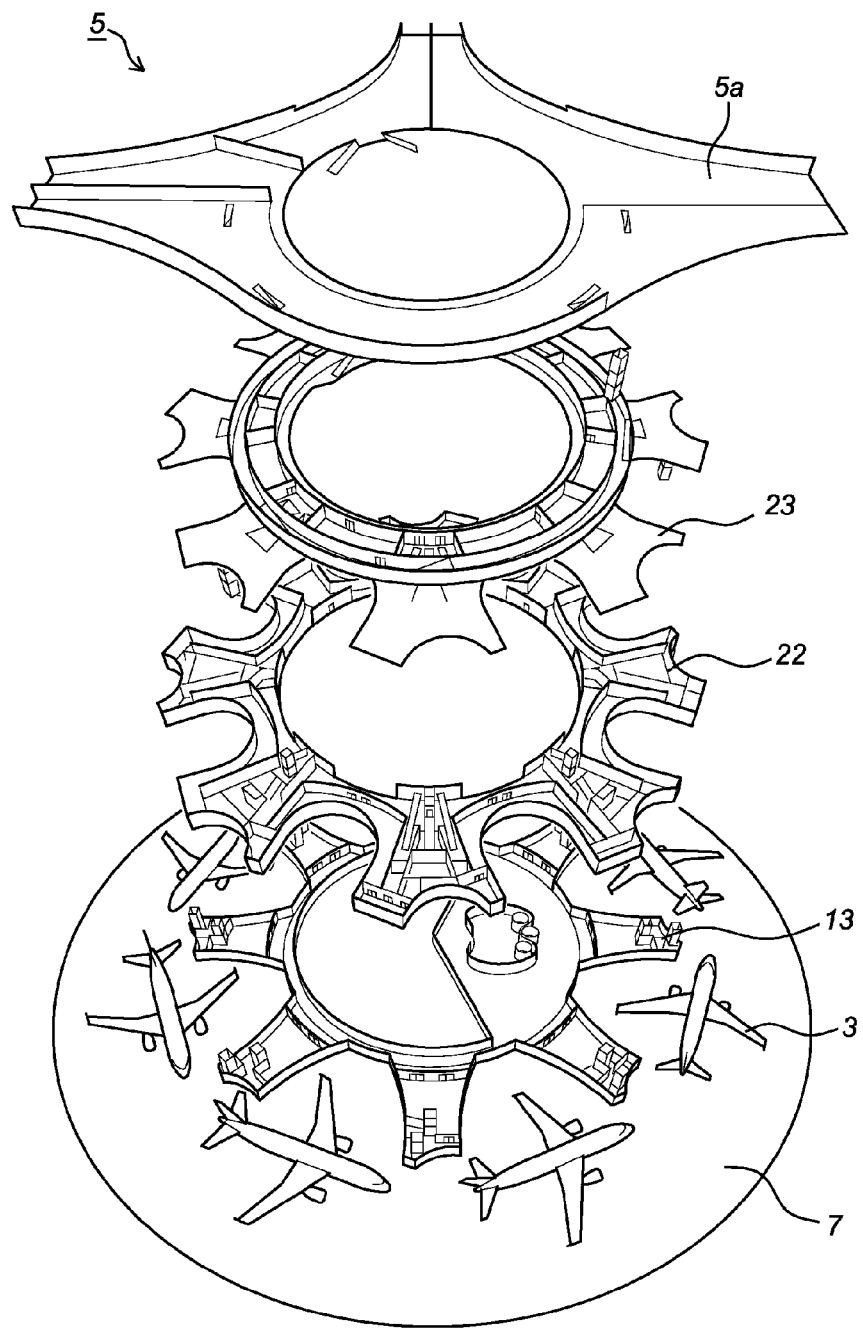

FIG. 3 is a perspective view with exploded parts of a part of the system as shown in FIG. 2a and as applied at the airport 1 shown in FIG. 1. The lowermost layer shown is maintenance area 13 which is positioned on floor level -I, as basement, above which is positioned apron 7 on which the aircraft 3 for processing are positioned. The uppermost layer 5a shown is the stationary part of passenger terminal 5. The intermediate layers 22, 23 in fact form the gates via which aircraft 3 is accessible to passengers. Components 13, 7, 22, 23 are usually connected to each other, whereby maintenance area 13 and gates 22, 23 co-rotate with apron 7.

Figure 4A:
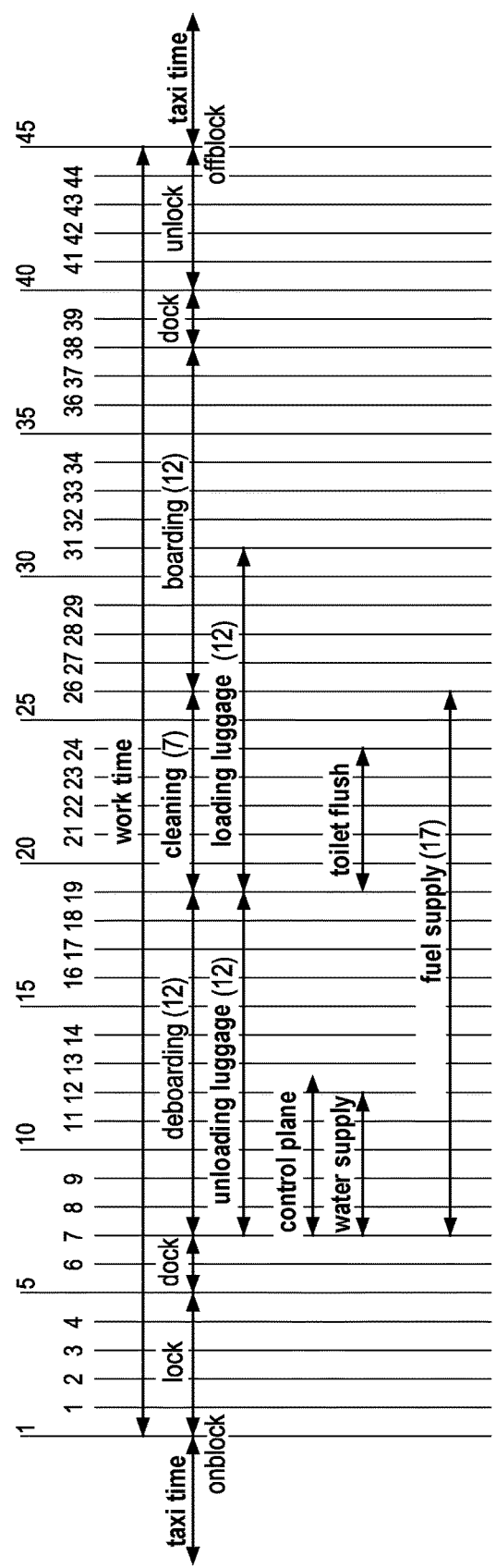
FIG. 4a shows a time schedule for processing an aircraft by applying the system according to FIG. 1.
Figure 4B:
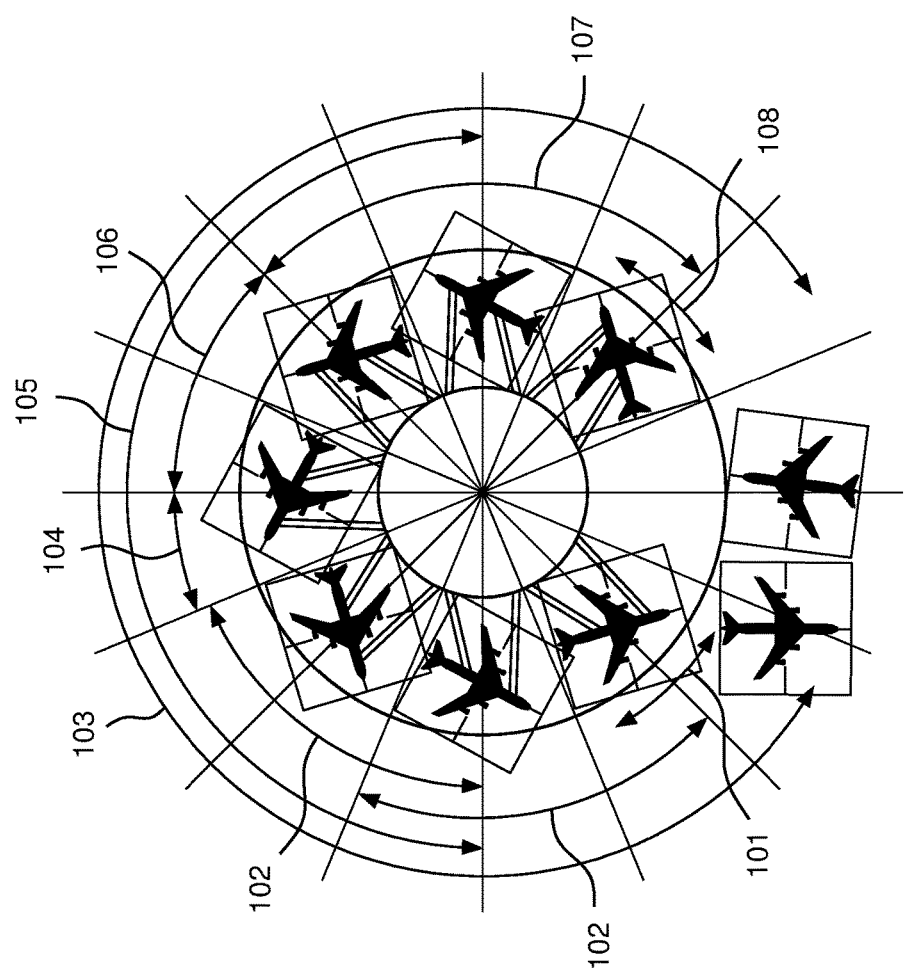
FIG. 4b is a schematic view of the processing of the passenger space of an aircraft in accordance with the time schedule shown in FIG. 4a, FIG. 4c is a schematic view of the processing of a cargo space of an aircraft separated from the passenger space, in accordance with the time schedule shown in FIG. 4a, FIG. 5a shows a top view of another system according to the invention.
Figure 4C:
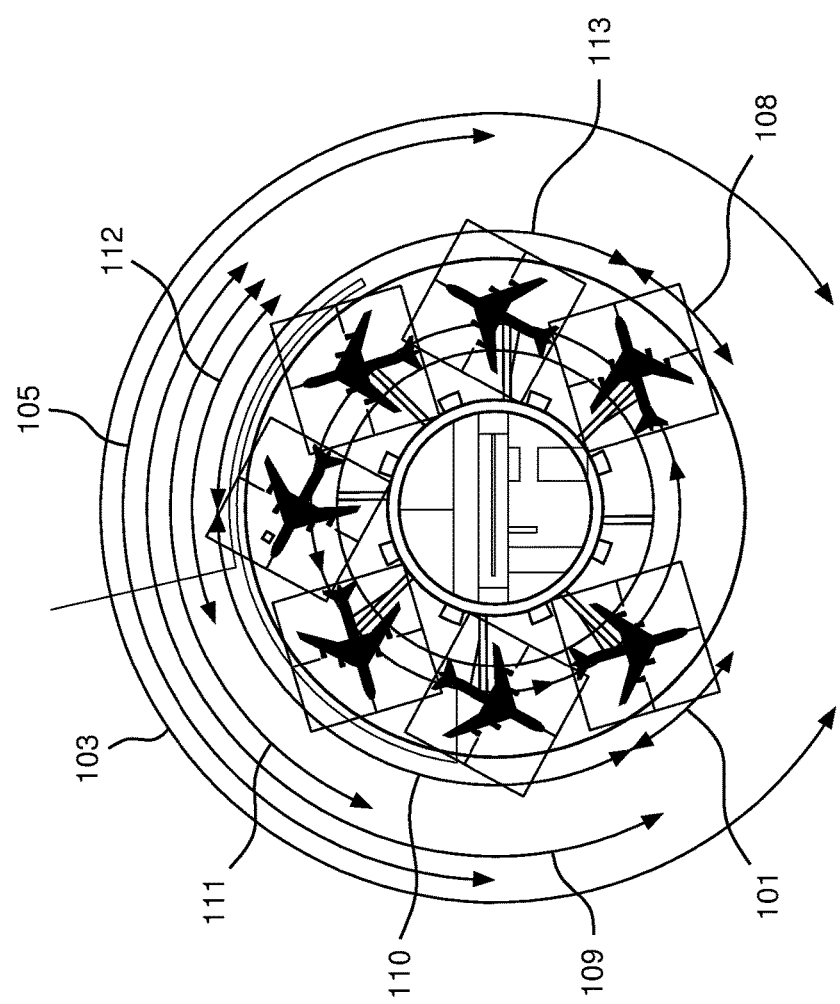

FIG. 4a shows a possible time schedule for processing an aircraft by applying a system according to the invention, for instance a system as shown in FIGS. 1-3, wherein the processing of the passenger space of an aircraft is shown over time in the associated FIG. 4b and wherein the (simultaneous) processing of the loading space including fuel tank, separated from the passenger cabin, is shown over time in the associated FIG. 4c. FIGS. 4a-4c show that the complete cycle for processing an aircraft takes about 45 minutes and that multiple processes can take place simultaneously. The duration of the cycle can be modified by having the drive motor rotate apron 7 at a different speed, on the basis of which the processes and the timing of the individual processes as shown in FIGS. 4a-4c can be modified. Determined processes can optionally be dispensed with here.

FIG. 5a shows a particular embodiment of a system according to the invention, for instance a system as shown in FIGS. 1-3, which shows that each processing segment 8 of apron 7 is provided with outer rotatable disc 24 and an inner rotatable disc 25 located within it. The smaller rotatable disc 25 is sufficiently large to support all support wheels of an aircraft 3. Discs 24, 25 will generally be configured to rotate in mutually opposite directions. Applying the rotatable disc set in each processing segment 8 can considerably facilitate the positioning (docking) of aircraft 3, wherein forces exerted on aircraft 3 remain limited because all support wheels are supported by a single disc 25, whereby torsion, tensile and compressive stresses on aircraft 3 are limited considerably.

This docking process is further shown in FIGS. 5b-5f, wherein the aircraft is positioned at the arrival location on inner disc 25 (FIG. 5b), after which aircraft 3 is positioned (FIG. 5c) at a location and orientation suitable for processing the aircraft (FIG. 5d) by rotating discs 24, 25 in opposite directions. Following processing of aircraft 3 the discs will once again rotate in opposite directions (FIG. 5e) until a departure location and orientation (FIG. 5f) are reached, from where the processed aircraft 3 can leave apron 7.

FIGS. 6a-6e show respectively alternative aprons 26, 27, 28, 29, 30, wherein the number of processing segments 26a, 27a, 28a, 29a, 30a used varies from five (FIG. 6a) to nine (FIG. 6e). The surface area of each apron 26, 27, 28, 29, 30 is related to the number of processing segments 26a, 27a, 28a, 29a, 30a. An apron smaller than the shown aprons 26, 27, 28, 29, 30 is undesirable because the resulting processing capacity would be too small. Although an apron larger than the apron 30 shown in FIG. 6e results in an advantageous greater processing capacity, this is undesirable from a practical viewpoint, on the one hand because the relatively heavy construction of the apron becomes more difficult to manage and on the other because the rotation speed at the outer peripheral edge of the apron then becomes so high that easy positioning of an aircraft on the apron is no longer possible.

It will be apparent that the invention is not limited to the exemplary embodiments shown and described here, but that within the scope of the appended claims numerous variants are possible which will be self-evident to the skilled person in this field.

Text referring to FIGS. 4b and 4c:
FIGS. 4b and 4c
- 101: undock 7 min
- 102: boarding 11 min
- 103: 48/75 min
- 104: distribution 4 min
- 105: 30 min
- 106: cleaning 7.5 min
- 107: boarding 15 min
- 108: dock 7 min
- 109: distribution 26 min
- 110: loading luggage 18 min
- 111: fuel supply (50%) 18 min
- 112: fuel supply (50%) 11 min
- 113: unloading luggage 18 min

The invention claimed is:

1. A system for parking and processing aircraft, comprising:
at least one transport device for transporting aircraft from an arrival location to a departure location at a distance from the arrival location, wherein the transport device comprises a plurality of processing segments lying in line and displaceable between the arrival location and the departure location, wherein each processing segment is configured to support and process at least one aircraft and wherein each processing segment is provided with at least one loading station and at least one unloading station for respectively loading and unloading the parked aircraft between the arrival location and the departure location, and
at least one passenger terminal positioned relative to the transport device such that the passenger terminal is configured to co-act with aircraft parked on the transport device for the purpose of allowing passengers to deboard and board between the arrival location and the departure location, wherein all processing segments are positioned in the same substantially horizontal plane, wherein the processing segments are displaceable along a curved path, wherein the processing segments together form at least a part of a processing apron forming an axially rotatable disc.

2. The system as claimed in claim 1, wherein the transport device is configured to displace the processing segments in a single direction.

3. The system as claimed in claim 1, wherein the transport device takes a continuous form.

4. The system as claimed in claim 1, wherein each processing segment is configured to support one aircraft.

5. The system as claimed in claim 1, wherein the processing segments connect to each other.

6. The system as claimed in claim 5, wherein the processing segments are connected integrally to each other.

7. The system as claimed in claim 1, wherein at least a part of the passenger terminal is enclosed by the processing apron.

8. The system as claimed in claim 1, wherein each processing segment is formed by a circle segment of the disc-shaped apron.

9. The system as claimed in claim 1, wherein at least a part of the passenger terminal is displaceable, in particular rotatable, such that the displaceable part of the passenger terminal and an adjacent processing segment can co-act in substantially stationary manner along a path situated between the arrival location and departure location.

10. The system as claimed in claim 9, wherein the displaceable part of the passenger terminal comprises a plurality of footbridges, wherein each footbridge is configured for coupling between the arrival location and the departure location to an aircraft parked on a processing segment to allow deboarding and boarding of passengers.

11. The system as claimed in claim 10, wherein the number of footbridges used is greater than the number of processing segments used.

12. The system as claimed in claim 9, wherein each footbridge is pivotally connected to a displaceable, in particular rotatable, other part of the passenger terminal.

13. The system as claimed in claim 1, wherein at least one loading station is configured to load the aircraft with luggage or freight.

14. The system as claimed in claim 1, wherein at least one unloading station is configured to remove luggage or freight from the aircraft.

15. The system as claimed in claim 1, wherein at least one loading station is configured to load the aircraft with fuel.

16. The system as claimed in claim 1, wherein at least one loading station is configured to load the aircraft with water.

17. The system as claimed in claim 1, wherein at least one unloading station is configured to remove waste water from the aircraft.

18. The system as claimed in claim 1, wherein at least one loading station is configured to load the aircraft with provisions, in particular food.

19. The system as claimed in claim 1, wherein at least one station of the at least one loading station and the at least one unloading station is connected in displaceable, in particular extendable, manner to a deck layer of the processing segment.

20. The system as claimed in claim 1, wherein the system comprises at least one supply container for fuel connected to at least one loading station and positioned at least partially under the displaceable processing segments.

21. The system as claimed in claim 1, wherein the system comprises at least one supply container for water connected to at least one loading station and positioned at least partially under the displaceable processing segments.

22. The system as claimed in claim 1, wherein the system comprises at least one supply container for waste water connected to at least one unloading station and positioned at least partially under the displaceable processing segments.

23. The system as claimed in claim 1, wherein each processing segment has passing therethrough at least one associated loading station and the at least one associated unloading station.

24. The system as claimed in claim 1, wherein at least one displaceable processing segment comprises at least one axially rotatable first maneuvering disc for maneuvering at least one support wheel of the aircraft.

25. The system as claimed in claim 24, wherein the at least one displaceable processing segment comprises at least one axially rotatable second maneuvering disc for maneuvering the at least one support wheel of the aircraft.

26. The system as claimed in claim 25, wherein the at least one axially rotatable first maneuvering disc is surrounded by the at least one axially rotatable second maneuvering disc.

27. The system as claimed in claim 1, wherein the transport device comprises at least one stationary support structure for bearing support of the plurality of processing segments.

28. The system as claimed in claim 27, wherein the processing segments are provided with transport wheels, these transport wheels being configured for co-action with a guide track of the stationary support structure.

29. The system as claimed in claim 28, wherein the support structure is provided with at least one liquid column, wherein the processing segments are supported by the at least one liquid column.

30. The system as claimed in claim 1, wherein the system comprises at least one drive unit coupled to the transport device for the purpose of displacing the processing segments.

31. The system as claimed in claim 30, wherein the drive unit is configured to displace a processing segment within a time period of between 30 and 60 minutes from the arrival location to the departure location.

32. The system as claimed in claim 1, wherein the number of processing segments lies between 4 and 12.

33. The system as claimed in claim 32, wherein the number of processing segments lies between 5 and 9.

34. The system as claimed in claim 1, wherein at least one aircraft is parked on at least one processing segment for the purpose of processing the aircraft.

35. The system as claimed in claim 1, wherein the system comprises a plurality of transport devices.

36. An airport provided with a system as claimed in claim 1.

37. The system as claimed in claim 1, wherein the processing segments are displaceable along a circular path.

38. A method for parking and processing aircraft, comprising the steps of:
A) parking an aircraft on a processing segment of a plurality of processing segments of a transport device at an arrival location, wherein the plurality segments are positioned in the same substantially horizontal plane, the plurality of processing segments are displaceable along a curved path, and wherein the plurality of processing segments together form at least a part of a processing apron forming an axially rotatable disc,
B) displacing the processing segment in the direction of a departure location by axially rotating the processing apron, wherein the aircraft is coupled during this displacement to a passenger terminal and one or more loading stations and unloading stations for the purpose of loading and unloading the aircraft, and
C) removing the aircraft from the processing segment when it reaches the departure location.

39. The method as claimed in claim 38, wherein the steps A)-C) take a period of time of between 30 and 60 minutes.

40. The method as claimed in claim 39, wherein multiple series of steps A)-C) are performed in succession.

41. The method as claimed in claim 40, wherein step B) of a first series and step B) of at least one other series are performed at least partially simultaneously.

* * * * *

UNITED STATES PATENT AND TRADEMARK OFFICE
CERTIFICATE OF CORRECTION

| | |
|---|---|
| PATENT NO. | : 9,586,696 B2 |
| APPLICATION NO. | : 14/647660 |
| DATED | : March 7, 2017 |
| INVENTOR(S) | : Maarten Soederhuizen et al. |

It is certified that error appears in the above-identified patent and that said Letters Patent is hereby corrected as shown below:

In the Claims

Column 12, Line 14, Claim 38, after "plurality" insert -- of processing --

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*